Dec. 15, 1925.   F. H. BEYEA   1,565,616
METALLIC TIRE BEAD AND PROCESS OF MANUFACTURING THE SAME
Filed Aug. 17, 1921
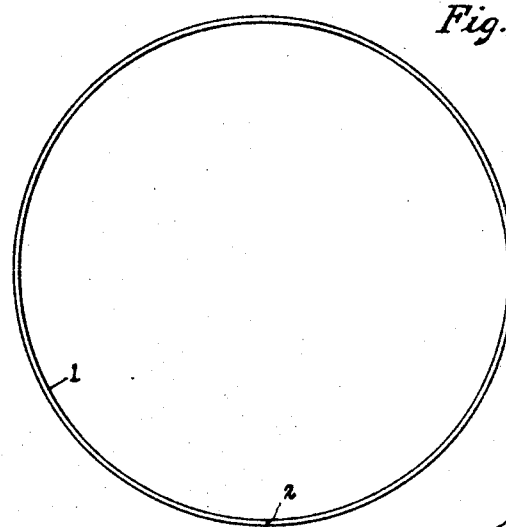
Fig. 1
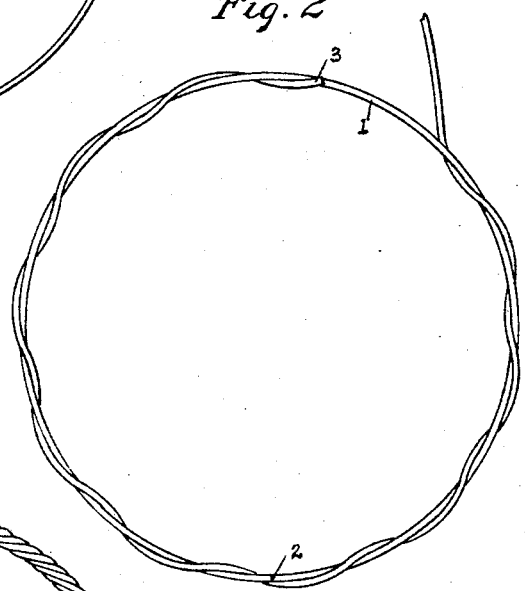
Fig. 2
Fig. 3
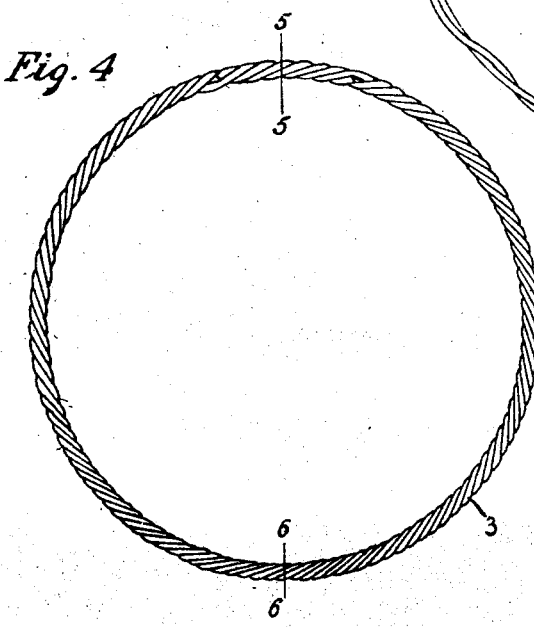
Fig. 4
Fig. 5
Fig. 6
Inventor
Frank H. Beyea
By G. L. Ely
Atty.

Patented Dec. 15, 1925.

1,565,616

UNITED STATES PATENT OFFICE.

FRANK H. BEYEA, OF AKRON, OHIO, ASSIGNOR TO JOHN R. GAMMETER, OF AKRON, OHIO.

METALLIC TIRE BEAD AND PROCESS OF MANUFACTURING THE SAME.

Application filed August 17, 1921. Serial No. 493,150.

*To all whom it may concern:*

Be it known that I, FRANK H. BEYEA, a citizen of the United States, residing at Akron, in the county of Summit, State of Ohio, have invented certain new and useful Improvements in Metallic Tire Beads and Processes of Manufacturing the Same, of which the following is a specification.

This invention relates to the art of manufacturing bead wires or cores for pneumatic tires, although it is not necessarily limited to this particular art as the principles of the invention may be extended to other uses. The purpose of the invention is to construct a new and improved form of cable ring or grommet which is used as the base or foundation of the inextensible bead of a pneumatic tire. It is the object of this invention to improve upon prior methods of constructing the endless bead wires used in tire manufacture.

Various forms of bead cores are used in the manufacture of beads, and this invention relates particularly to the manufacture of cable beads. Prior cable beads have been made by welding together the ends of a single length of wire cable, but the expanding process to which the ring thus formed is subjected, in order to size it or for other purposes, has often caused the bead to separate at the weld. Another type of bead has been recently developed in which a core ring has been used about which are wrapped one or more covering wires, the ends of the wire or wires, after being cut, being tucked within the bead. This form of bead has not been satisfactory as it has a tendency to shrink or contract after being expanded to size.

An improved form of bead has also been designed by me, which is the subject matter of a prior application, Serial Number 472,623, filed May 26, 1921 (Pat. No. 1,522,797, granted to me Jan. 13, 1925), in which a core wire has been covered with a wrapping wire, the ends of which are joined together by soldering or brazing. While this form of bead has been satisfactory, the present invention is intended as an improvement thereon, strengthening the bead at the joint and facilitating its manufacture.

In the drawings accompanying this application is shown one form of the invention; and while the showing and description is such as to enable one skilled in the art to practice the invention, it is not to be understood as limiting the invention to the exact details as shown.

In the drawings:

Fig. 1 is a side elevation of the core wire,

Fig. 2 is a similar view showing the outer or covering wire during the winding or wrapping operation, Fig. 3 is a fragmentary view showing the method of wrapping the covering wire around the core wire, Fig. 4 is a side elevation of the completed bead, Fig. 5 is a section on the line 5—5 of Fig. 4, and Fig. 6 is a section on the line 6—6 of Fig. 4.

In practicing this invention, I first construct a ring of wire which serves as the core or foundation for the bead. This ring is indicated by the numeral 1, the joint being indicated by the numeral 2. The ends of the core wire may be joined at the joint 2 by welding or any other means, if desired, although it has been found satisfactory to leave the ends in abutting relation without joining them together. About the core wire is wrapped a layer of covering or wrapping wire 3, the wire being wound about the core until the entire core wire is covered. The covering wire is preferably crimped or formed with undulations so as to accommodate itself more easily to the wrapping operation.

Instead of tucking in the ends of the wire after the wrapping operation as is done in the prior art, or joining the ends of the wire together by soldering, according to the present invention I continue the wrapping operation past the first end of the covering wire so that there is provided a short space in which the ends of the wire overlap. This is shown in Fig. 4.

By overlapping the ends of the covering wire, the bead for a short distance is made thicker by one wire than in the other portions of the bead. This will be shown by a comparison of Figs. 5 and 6. This slightly thickened area is not objectionable, and several valuable results are attained by overlapping the wire.

The joint is reinforced by the extra thickness of wire and as a result is as strong as the remainder of the bead. Furthermore, by overlapping the ends of the wire, it is not necessary for the operator to cut the wire accurately so that the ends will just abut. This saves labor and material.

If desired, the joint in the bead can be soldered by flowing the solder over the wire at some point in the overlap, as shown in Fig. 5, also the joint 2 can be placed in the overlapping area, in which case the solder will permanently join the ends of the core wire. If the soldering operation is performed, the overlapping ends of the wire are permanently connected to the outside of the bead and to the adjacent coils of the covering wire and separation is impossible. It is also impossible for the bead to shrink after expansion, as the expansion of the ring must take place by stretching of the wire and not by tightening of the coils as has been true in wire cable beads in which the ends are not permanently secured.

It will be noted that the core wire and the covering wire are of the same diameter, with the result that six strands of the covering wire will surround the core wire. If it is desired to increase the size of the bead, the diameter of the core wire may be increased, and the same covering wire used for the remainder of the bead. As a result a larger number of wrappings of the covering wire are required to surround the core wire.

I do not desire to be limited herein to the exact showing of the invention, as its scope, within the attached claims, covers modifications and alterations. The invention is also not limited to the permanent attachment of the ends of the wire to the body of the bead, as they may be left free and constitute a satisfactory bead structure.

Claims:

1. A wire ring for use in tire beads or for similar purposes, comprising a circular core wire and a wrapping wire surrounding the core wire, the ends of the wrapping wire being overlapped.

2. A wire ring for use in tire beads or for similar purposes, comprising a circular core wire and a wire covering the core wire, said wire being wrapped around the core wire a plurality of times, the ends of the wire being overlapped on the outside of the ring.

3. A wire ring for use in tire beads or for similar purposes, comprising a circular core wire and a wrapping wire surrounding the core wire, the ends of the wrapping wire being overlapped and permanently secured together.

4. A wire ring for use in tire beads or for similar purposes, comprising a circular core wire and a wrapping wire surrounding the core wire, the ends of the wrapping wire being overlapped and permanently secured to the body of the ring.

5. A wire ring for use in tire beads, comprising a circular core and a covering wire wrapped about said core in a plurality of convolutions, the ends of the covering wire overlapping and being permanently secured to the body of the ring.

6. The process of manufacturing tire beads comprising forming a core of wire, wrapping a second wire over the said core until it is covered, and overlapping the ends of the second wire on the outside of the core.

7. The process of manufacturing tire beads comprising forming a core of wire, wrapping a second wire over the said core until it is covered, overlapping the ends of the second wire, and permanently connecting the ends of the wire to the core.

8. The process of manufacturing wire rings for tire beads, comprising forming a core ring of wire, wrapping a covering wire about the core ring in a plurality of convolutions until the core ring is covered, overlapping the ends of the covering wire over a short space, and soldering the wire together at the point of overlap.

FRANK H. BEYEA.